(12) United States Patent
Liu et al.

(10) Patent No.: US 10,805,151 B2
(45) Date of Patent: Oct. 13, 2020

(54) METHOD, APPARATUS, AND STORAGE MEDIUM FOR DIAGNOSING FAILURE BASED ON A SERVICE MONITORING INDICATOR OF A SERVER BY CLUSTERING SERVERS WITH SIMILAR DEGREES OF ABNORMAL FLUCTUATION

(71) Applicant: BEIJING BAIDU NETCOM SCIENCE TECHNOLOGY CO., LTD., Beijing (CN)

(72) Inventors: Ping Liu, Beijing (CN); Yu Chen, Beijing (CN); Yun Chen, Beijing (CN); Xianping Qu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 4 days.

(21) Appl. No.: 16/354,074

(22) Filed: Mar. 14, 2019

(65) Prior Publication Data
US 2019/0372832 A1 Dec. 5, 2019

(30) Foreign Application Priority Data
May 31, 2018 (CN) .......................... 2018 1 0556786

(51) Int. Cl.
*H04L 12/24* (2006.01)
*H04L 12/26* (2006.01)

(52) U.S. Cl.
CPC ........ *H04L 41/0695* (2013.01); *H04L 41/064* (2013.01); *H04L 41/0677* (2013.01); *H04L 41/0816* (2013.01); *H04L 41/0853* (2013.01); *H04L 41/0859* (2013.01); *H04L 41/142* (2013.01); *H04L 43/08* (2013.01)

(58) Field of Classification Search
CPC ... H04L 41/0695; H04L 43/08; H04L 41/142; H04L 41/0859; H04L 41/0853; H04L 41/0816; H04L 41/0677; H04L 41/064
See application file for complete search history.

(56) References Cited

U.S. PATENT DOCUMENTS

| 6,282,175 B1 * | 8/2001 | Steele ................. G06F 11/0709 370/254 |
| 6,363,420 B1 * | 3/2002 | Coward ............. H04L 41/0816 709/220 |

(Continued)

FOREIGN PATENT DOCUMENTS

| CN | 106502907 A | * | 3/2017 |
| CN | 107943668 A | * | 4/2018 |

(Continued)

*Primary Examiner* — Daniel C. Murray
(74) *Attorney, Agent, or Firm* — J.C. Patents

(57) ABSTRACT

A method, an apparatus and a storage medium for diagnosing failure based on a service monitoring indicator are provided. Service monitoring indicator of a server is analyzed to obtain a degree of abnormal fluctuation in the service monitoring indicator. Servers with similar degrees of abnormal fluctuation are clustered according to the degree of abnormal fluctuation of the service monitoring indicator, to obtain clustered results that include the servers and the service monitoring indicator. A location where the service fails is determined according to the clustered results.

13 Claims, 4 Drawing Sheets

(56) References Cited

U.S. PATENT DOCUMENTS

| | | | |
|---|---|---|---|
| 6,678,250 B1* | 1/2004 | Grabelsky | H04L 43/06 370/241 |
| 7,647,524 B2* | 1/2010 | Ide | G06F 11/0709 709/224 |
| 8,645,769 B2* | 2/2014 | Hasegawa | G06F 11/079 714/48 |
| 8,700,875 B1* | 4/2014 | Barron | G06F 3/0605 711/170 |
| 8,892,960 B2* | 11/2014 | Sambamurthy | G06F 11/079 714/47.3 |
| 9,195,563 B2* | 11/2015 | Scarpelli | G06F 11/3495 |
| 9,276,634 B1* | 3/2016 | Duff | G01D 4/002 |
| 9,355,007 B1* | 5/2016 | Eicher | G06F 11/3428 |
| 9,417,892 B2* | 8/2016 | Croy | G06F 3/0484 |
| 9,424,121 B2* | 8/2016 | Kushnir | G06F 11/079 |
| 9,904,584 B2* | 2/2018 | Konig | G06F 11/3419 |
| 10,042,697 B2* | 8/2018 | Ahad | G06F 11/0709 |
| 10,122,872 B1* | 11/2018 | Shin | H04N 1/00344 |
| 10,454,753 B2* | 10/2019 | Sasturkar | G06F 16/285 |
| 10,546,241 B2* | 1/2020 | Yang | G06F 11/3452 |
| 10,581,961 B2* | 3/2020 | Zhou | G06F 11/3433 |
| 10,708,139 B2* | 7/2020 | Rosh | H04L 41/12 |
| 2002/0049838 A1* | 4/2002 | Sylor | H04L 41/22 709/224 |
| 2002/0059404 A1* | 5/2002 | Schaaf | H04L 67/303 709/220 |
| 2005/0234931 A1* | 10/2005 | Yip | H04L 41/0816 |
| 2006/0136581 A1* | 6/2006 | Smith | H04L 41/145 709/224 |
| 2006/0190775 A1* | 8/2006 | Aggarwal | H04L 41/0816 714/100 |
| 2006/0212924 A1* | 9/2006 | Xie | H04L 63/102 726/1 |
| 2008/0140817 A1* | 6/2008 | Agarwal | H04L 67/125 709/223 |
| 2009/0019141 A1* | 1/2009 | Bush | H04L 41/26 709/223 |
| 2013/0167232 A1* | 6/2013 | Weber | H04L 63/145 726/23 |
| 2013/0246606 A1* | 9/2013 | Branch | H04L 41/0853 709/224 |
| 2014/0043983 A1* | 2/2014 | Huang | H04L 41/0677 370/244 |
| 2014/0058705 A1* | 2/2014 | Brill | G06Q 10/063 702/183 |
| 2014/0189086 A1* | 7/2014 | Chattopadhyay | H04L 41/0873 709/223 |
| 2014/0207929 A1* | 7/2014 | Hoshino | H04L 63/08 709/223 |
| 2014/0317255 A1* | 10/2014 | Krishna | H04L 41/0889 709/223 |
| 2015/0081883 A1* | 3/2015 | Katz | G06K 9/6219 709/224 |
| 2015/0100579 A1* | 4/2015 | Oba | H04L 41/0853 707/737 |
| 2015/0341246 A1* | 11/2015 | Boubez | H04L 41/0883 709/224 |
| 2016/0147585 A1* | 5/2016 | Konig | G06F 11/20 714/37 |
| 2016/0227434 A1* | 8/2016 | Grinshpun | H04L 43/08 |
| 2017/0060124 A1* | 3/2017 | Hara | G05B 23/0221 |
| 2017/0187568 A1* | 6/2017 | Sato | H04L 45/28 |
| 2017/0230229 A1* | 8/2017 | Sasturkar | G06F 16/285 |
| 2018/0176103 A1* | 6/2018 | Wei | H04W 16/18 |
| 2018/0191553 A1* | 7/2018 | Ramteke | H04L 41/064 |
| 2018/0248905 A1* | 8/2018 | Cote | G06K 9/6269 |
| 2018/0295014 A1* | 10/2018 | Huang | H04L 41/0604 |
| 2019/0044815 A1* | 2/2019 | Rosh | H04L 41/14 |
| 2019/0044820 A1* | 2/2019 | Rosh | H04L 41/22 |
| 2019/0079821 A1* | 3/2019 | Jeong | H04L 41/065 |
| 2019/0087248 A1* | 3/2019 | Pendar | G06F 11/3006 |
| 2019/0215239 A1* | 7/2019 | Li | H04L 41/5009 |
| 2019/0372859 A1* | 12/2019 | Mermoud | H04L 41/16 |
| 2020/0236015 A1* | 7/2020 | Li | G06N 20/00 |

FOREIGN PATENT DOCUMENTS

| | | | |
|---|---|---|---|
| CN | 110032480 A | * 7/2019 | |
| CN | 110287081 A | * 9/2019 | |
| JP | 5375829 B2 | * 12/2013 | ......... G06F 11/0751 |
| KR | 20190096706 A | * 8/2019 | |

* cited by examiner

METHOD, APPARATUS, AND STORAGE MEDIUM FOR DIAGNOSING FAILURE BASED ON A SERVICE MONITORING INDICATOR OF A SERVER BY CLUSTERING SERVERS WITH SIMILAR DEGREES OF ABNORMAL FLUCTUATION

CROSS-REFERENCE TO RELATED APPLICATION

This application claims priority to Chinese Patent Application No. 201810556786.3, filed on May 31, 2018, which is hereby incorporated by reference in its entirety.

TECHNICAL FIELD

The embodiments of the present disclosure relate to Internet technologies, and in particular, to a method, an apparatus and a storage medium for diagnosing failure based on a service monitoring indicator.

BACKGROUND

In recent years, with the rapid development of Internet technologies, the scale of network service system and the complexity of their internal modules continue to increase, which leads to an increasing difficulty in the diagnosis of service failure.

Existing diagnosis of failure mainly relies on manual analysis and troubleshooting, which consumes a large amount of cost in labors and time, and some failure diagnosis processes can be very time-consuming, making it difficult to diagnose the failure and control the damage in a timely and efficient manner.

Therefore, there is an urgent need for a failure diagnosis solution that performs failure diagnosis and controls damage in a timely and efficient manner.

SUMMARY

The embodiments of the present disclosure provide a method, an apparatus and a storage medium for diagnosing failure based on a service monitoring indicator to perform failure diagnosis and damage control in a timely and efficient manner, and improve the stability of the service.

In a first aspect, an embodiment of the present disclosure provides a method for diagnosing failure based on a service monitoring indicator, the method includes:

analyzing, according to an abnormality fluctuation detection algorithm, a service monitoring indicator of a server, in which a service is located, to obtain a degree of abnormal fluctuation in the service monitoring indicator;

clustering servers with similar degrees of abnormal fluctuation according to the degree of abnormal fluctuation of the service monitoring indicator, where clustered results include the servers and the service monitoring indicator; and determining, according to the clustered results, a location where the service fails.

In a possible design, the analyzing, according to an abnormality fluctuation detection algorithm, a service monitoring indicator of a server, in which a service is located, to obtain a degree of abnormal fluctuation in the service monitoring indicator includes:

calculating a degree of first fluctuation and a degree of second fluctuation of the service monitoring indicator using kernel density estimation (KDE), where the degree of first fluctuation is a degree of fluctuation in the service monitoring indicator on the same day that the failure occurs, and the degree of second fluctuation is a degree of fluctuation in the service monitoring indicator within a preset time period before the failure occurs; and comparing, according to an extreme value theory, the degree of first fluctuation and the degree of second fluctuation to determine a probability that the degree of first fluctuation is an abnormal fluctuation, so as to obtain the degree of abnormal fluctuation of the service monitoring indicator.

In a possible design, the clustering servers with similar degrees of abnormal fluctuation according to the degree of abnormal fluctuation of the service monitoring indicator includes:

clustering, according to a preset clustering algorithm, servers with similar degrees of abnormal fluctuation based on the degree of abnormal fluctuation in the service monitoring indicator, where the preset clustering algorithm is a hierarchical clustering algorithm or a DBSCAN algorithm.

In a possible design, before the clustering servers with similar degrees of abnormal fluctuation using a preset clustering algorithm, the method further includes:

for each server, sorting the degree of abnormal fluctuation in the service monitoring indicator corresponding to the each server to obtain a sorted result corresponding to the each server;

calculating a correlation coefficient between sorted results corresponding to two servers; and correspondingly, the clustering servers with similar degrees of abnormal fluctuation using a preset clustering algorithm includes: clustering servers with similar degrees of abnormal fluctuation using a preset clustering algorithm based on the correlation coefficient.

In a possible design, each computer room includes a plurality of the servers, the service includes at least one module, and the clustering servers with similar degrees of abnormal fluctuation using a preset clustering algorithm includes:

clustering the servers included in the each computer room according to the module included in the service.

In a possible design, the determining, according to the clustered results, the location where the service fails includes:

sorting the clustered results according to a preset sorting strategy; and determining, according to the sorted results, a location where the service fails.

In a possible design, before the analyzing, according to an abnormality fluctuation detection algorithm, a service monitoring indicator of a server, in which a service is located, to obtain a degree of abnormal fluctuation in the service monitoring indicator, the method further includes:

obtaining historical data of the service monitoring indicator of a server in which the service is located; and correspondingly, the analyzing, according to an abnormality fluctuation detection algorithm, a service monitoring indicator of a server, in which a service is located, to obtain a degree of abnormal fluctuation in the service monitoring indicator includes: analyzing, according to an abnormality fluctuation detection algorithm, the historical data to obtain the degree of abnormal fluctuation in the service monitoring indicator.

In a second aspect, an embodiment of the present disclosure provides an apparatus for diagnosing failure based on a service monitoring indicator, the apparatus including:

an analyzing module, configured to analyze, according to an abnormality fluctuation detection algorithm, a service monitoring indicator of a server, in which a service is located, to obtain a degree of abnormal fluctuation in the service monitoring indicator;

a clustering module, configured to cluster servers with similar degrees of abnormal fluctuation according to the degree of abnormal fluctuation of the service monitoring indicator, where clustered results include the servers and the service monitoring indicator; and a determining module, configured to determine, according to the clustered results, a location where the service fails.

In a possible design, the analyzing module is specifically configured to:

calculate a degree of first fluctuation and a degree of second fluctuation of the service monitoring indicator using kernel density estimation (KDE), where the degree of first fluctuation is a degree of fluctuation in the service monitoring indicator on the same day that the failure occurs, and the degree of second fluctuation is a degree of fluctuation in the service monitoring indicator within a preset time period before the failure occurs; and compare, according to an extreme value theory, the degree of first fluctuation and the degree of second fluctuation to determine a probability that the degree of first fluctuation is an abnormal fluctuation, so as to obtain the degree of abnormal fluctuation of the service monitoring indicator.

In a possible design, the clustering module is specifically configured to:

cluster, according to a preset clustering algorithm, servers with similar degrees of abnormal fluctuation based on the degree of abnormal fluctuation in the service monitoring indicator, where the preset clustering algorithm is a hierarchical clustering algorithm or a DBSCAN algorithm.

In a possible design, the clustering module is further configured to:

before the clustering servers with similar degrees of abnormal fluctuation using a preset clustering algorithm, for each server, sort the degree of abnormal fluctuation in the service monitoring indicator corresponding to the each server to obtain a sorted result corresponding to the each server;

calculate a correlation coefficient between sorted results corresponding to two servers; and correspondingly, when clustering servers with similar degrees of abnormal fluctuation using a preset clustering algorithm, the clustering module is specifically configured to: cluster servers with similar degrees of abnormal fluctuation using a preset clustering algorithm based on the correlation coefficient.

In a possible design, each computer room includes a plurality of the servers, the service includes at least one module;

when clustering servers with similar degrees of abnormal fluctuation using a preset clustering algorithm, the clustering module is specifically configured to:

cluster the servers included in the each computer room according to the module included in the service.

In a possible design, the determining module is specifically configured to:

sort the clustered results according to a preset sorting strategy; and determine, according to the sorted results, a location where the service fails.

In a possible design, the apparatus further includes:

an obtaining module, configured to, before the analyzing module analyzes, according to an abnormality fluctuation detection algorithm, a service monitoring indicator of a server, in which a service is located, to obtain a degree of abnormal fluctuation in the service monitoring indicator, obtain historical data of the service monitoring indicator of a server in which the service is located; and correspondingly, the analyzing module is specifically configured to: analyze, according to an abnormality fluctuation detection algorithm, the historical data to obtain the degree of abnormal fluctuation in the service monitoring indicator.

In a third aspect, an embodiment of the present disclosure provides an apparatus for diagnosing failure based on a service monitoring indicator, where the apparatus includes a processor and a memory;

the memory stores computer executable instructions; and the processor executes the computer executable instructions stored in the memory, causing the processor to perform the method for diagnosing failure based on a service monitoring indicator according to any one of the first aspect.

In a fourth aspect, an embodiment of the present disclosure provides a computer readable storage medium storing therein computer executable instructions that, when executed by a processor, implement the method for diagnosing failure based on a service monitoring indicator according to any one of the first aspect.

According to the method, apparatus and storage medium for diagnosing failure based on a service monitoring indicator provided by the embodiments of the present disclosure, an abnormality fluctuation detection algorithm is applied to a service monitoring indicator of a server, in which a service is located, to obtain a degree of abnormal fluctuation in the service monitoring indicator. Then, servers with similar degrees of abnormal fluctuation are clustered according to the degree of abnormal fluctuation of the service monitoring indicator. Further, a failure is located for the service according to the clustered results. The embodiments of the present disclosure automatically scan all the service monitoring indicators for all servers, and finally suggest the servers and service monitoring indicators that may have caused the failures. These can narrow the scope for the failure diagnosis, thereby helping the operation and maintenance personnel to perform failure diagnosis and damage control in a timely and efficient manner, and improving the stability of the service.

BRIEF DESCRIPTION OF THE DRAWINGS

In order to more clearly illustrate the embodiments of the present disclosure or the technical solutions in the prior art, the following is a brief description of the drawings that need to be used in describing the embodiments and the prior art. Obviously, the drawings in the following description are merely some embodiments of the present disclosure, and those skilled in the art can obtain other drawings based on these drawings without paying any inventive work.

DESCRIPTION OF EMBODIMENTS

In order to make the objects, technical solutions and advantages of the embodiments of the present disclosure more clear, the technical solutions in the embodiments of the present disclosure will be clearly and comprehensively described in the following with reference to the accompanying drawings in the embodiments of the present disclosure. Obviously, the described embodiments are part, rather than all, of the embodiments of the present disclosure. Based on the embodiments of the present disclosure, all other embodiments obtained by those skilled in the art fall within the scope of the present disclosure without inventive work.

Figure 1:
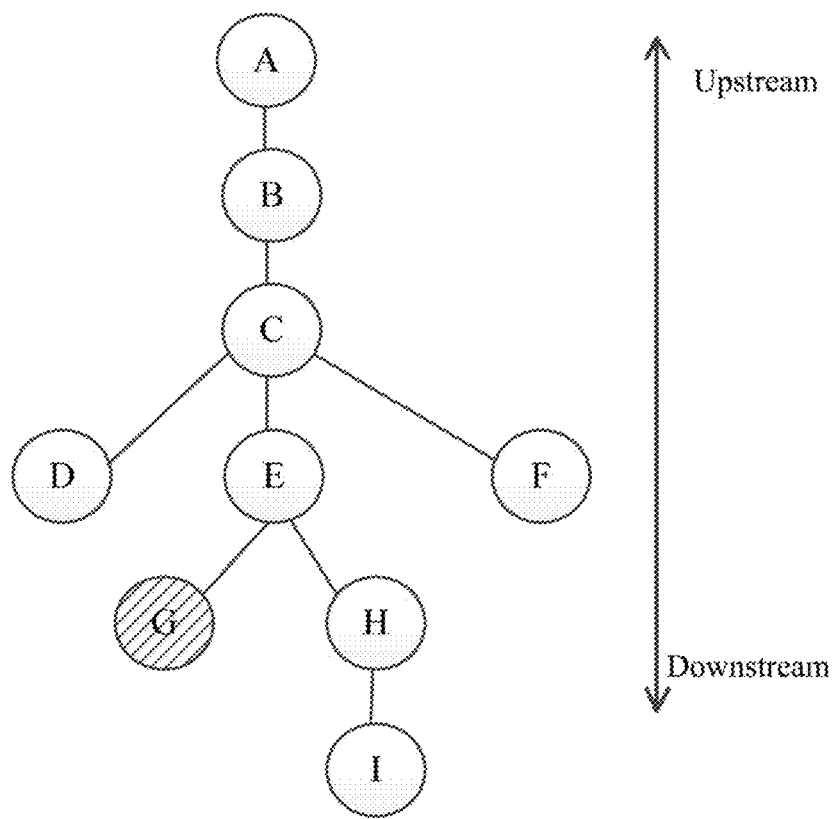
FIG. 1 is a module call graph provided in an embodiment of the present disclosure.

At present, the prior art mainly diagnoses failures manually. Specifically, the operation and maintenance personnel troubleshoot the network service system according to a module call graph, such as the one shown in FIG. 1. In most cases, the failure is found when many requests fail at the most upstream front-end module (i.e., the module A as shown in FIG. 1). At this time, the operation and maintenance personnel will begin the check from module A and move downstream. Since module A calls module B, it is necessary to check the indicator of module B. If the indicator of module B is abnormal, it is suspected that the failure is caused by module B. Then, the check moves on to module C, which is directly downstream of module B, and so on. In this process, the suspicion continues down the call graph of the modules, until the process cannot continue any further. In the example shown in FIG. 1, the suspicion process finally stops at module G. Of course, a real scenario is more complicated, which can involve not only checking whether there is any abnormality in the downstream module, but also checking the degree of the abnormality. This is only an example to facilitate understanding. For example, if the degree of abnormality is significantly less critical for module G than for module E, the root cause of the failure is more likely to be in module E.

Since the root cause of the failure can only be analyzed after the module causing the root cause has been identified, finding which module is the root cause of the failure is an important step in failure diagnosis.

Since large-scale services are deployed on thousands of servers with dozens to hundreds of service monitoring indicators, it takes a lot of time and manpower to diagnose failures through manual analysis and troubleshooting, making it difficult to perform failure diagnosis and contain the damage in a timely and efficient manner.

Based on the above problems, the embodiments of the present disclosure provide a method, an apparatus and a storage medium for diagnosing failure based on a service monitoring indicator to perform failure diagnosis and control the damage in a timely and efficient manner, and improve the stability of the service.

The following detailed embodiments are used to illustrate how the embodiments of the present disclosure implement failure diagnosis based on a service monitoring indicator.

Figure 2:
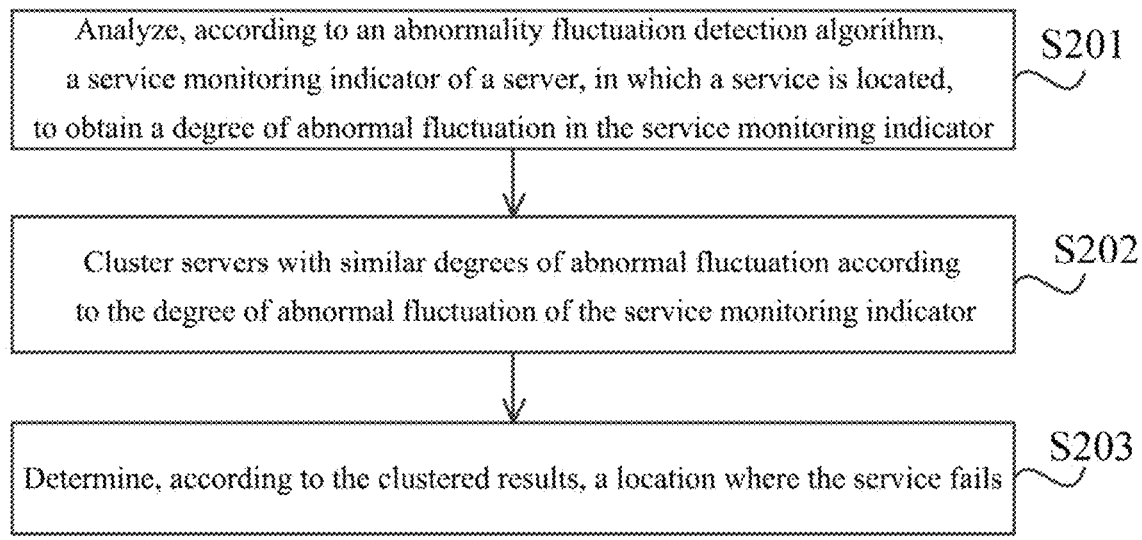
FIG. 2 is a flowchart of a method for diagnosing failure based on a service monitoring indicator provided in an embodiment of the present disclosure.

FIG. 2 is a flowchart of a method for diagnosing failure based on a service monitoring indicator according to an embodiment of the present disclosure. The embodiments of the present disclosure provide a method for diagnosing failure based on a service monitoring indicator, the execution body of the method for diagnosing failure based on a service monitoring indicator may be an apparatus for diagnosing failure based on a service monitoring indicator, which in turn may be implemented by software and/or hardware. Specifically, the apparatus for diagnosing failure based on the service monitoring indicator may be a stand-alone device, such as a terminal, a computer, etc. Alternatively, the apparatus for diagnosing failure based on the service monitoring indicator may be integrated into a terminal, such as a computer, etc. In the following, a terminal will be described as the execution subject.

As shown in FIG. 2, the method for diagnosing failure based on a service monitoring indicator includes:

S201, analyzing, according to an abnormality fluctuation detection algorithm, a service monitoring indicator of a server, in which a service is located, to obtain a degree of abnormal fluctuation of the service monitoring indicator.

In this step, the abnormality fluctuation detection algorithm refers to any algorithm that can detect whether the fluctuation in the service monitoring indicator is abnormal. Specifically, the fluctuation in the service monitoring indicator is the trend in the change of the service monitoring indicator over time.

Specifically, the service may be deployed on thousands of servers, each server with dozens or even hundreds of service monitoring indicators. In this step, the terminal analyzes all service monitoring indicators for all servers involved in the service to determine which of the service monitoring indicators is/are abnormal.

An abnormal fluctuation may be identified when, understandably, the degree of fluctuation (i.e., the probability of fluctuation) is less than a certain value, for example, 0.01. Higher degree of abnormal fluctuation in a service monitoring indicator leads to higher reliability for the failure diagnosis based on the service monitoring indicator.

Through this step, the abnormality of all service monitoring indicators involved in the service can be quantified, and the degree of abnormal fluctuation can be obtained. The degree of abnormality of different service monitoring indicators can be compared by the degree of abnormal fluctuation.

S202, clustering servers with similar degree of abnormal fluctuation according to the degree of abnormal fluctuation in the service monitoring indicator.

The clustered results include the server and the service monitoring indicator.

In order to facilitate viewing, the servers with similar degree of abnormal fluctuation need to be clustered together. Therefore, the purpose of this step is to cluster the servers according to the abnormal fluctuation degrees of the service monitoring indicators to obtain different clusters.

Clustering is one of the typical methods in unsupervised learning. The clustering is based on similarity, patterns in the same cluster share more similarities than patterns in different clusters. The algorithm for clustering may include partitioning methods, hierarchical methods, density-based methods, grid-based methods, model-based methods, etc.

S203, determining, according to the clustered results, a location where the service fails.

Since S202 has clustered together servers with similar degree of abnormal fluctuations, the clustered results include server and service monitoring indicators. Therefore, based on the clustered results, the failure can be located for the service, for example, at which service monitoring indicator of which server.

Then, the operation and maintenance personnel can further determining, according to the result, a location where the service fails obtained in the above steps.

The above steps automatically scan all service monitoring indicators of all servers, and finally suggest the server and service monitoring indicators that likely have caused the failure. This can greatly narrow the scope of the failure diagnosis from the initial "thousands of servers×hundreds of service monitoring indicators" to merely the top few of the clustered results.

In the embodiments of the present disclosure, the service monitoring indicator of the servers where the service resides is analyzed using an abnormal fluctuation detection algorithm, and the degree of abnormal fluctuation in the service monitoring indicator is obtained. Then, servers with similar degree of abnormal fluctuation are clustered according to the degree of abnormal fluctuation of the service monitoring indicator, and then the failure of the service is located according to the clustered results. Since the embodiments of the present disclosure automatically scan all the service monitoring indicators for all servers, and finally suggests the server and service monitoring indicators that may have caused the failures, which can greatly reduce the failure diagnosis space, thereby helping the operation and maintenance personnel to perform failure diagnosis and contain damage in a timely and efficient manner, improving the stability of the service.

Based on the above embodiments, the abnormal fluctuation detection algorithm and the clustering will be described below.

I. Abnormality Fluctuation Detection Algorithm

Considering that the abnormal fluctuation detection algorithm needs to solve the problem of comparing the degree of abnormal fluctuations across servers and service monitoring indicators, the inventor introduces an observed probability of indicator value, and measures the degree of abnormal fluctuation in the service monitoring indicator by the observed probability of indicator value. Obviously, the observed probability of indicator value is comparable, and across servers and service monitoring indicators.

Figure 3:
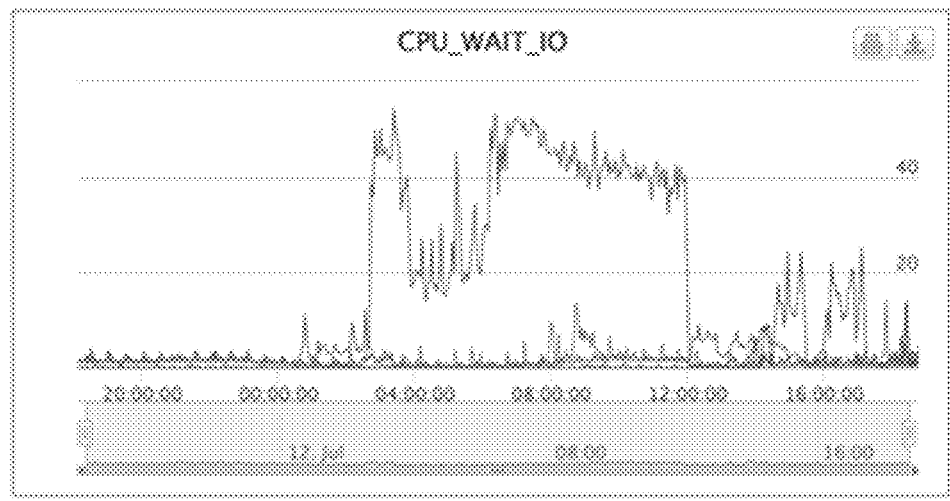
FIG. 3 is a diagram showing an example of a trend of a service monitoring indicator according to an embodiment of the present disclosure.

The observed probability of indicator value can be modeled and calculated from different angles, and the embodiments of the present disclosure mainly focus on the sudden increase or decrease in the indicator value. On one aspect, the sudden increase or decrease in the indicator value is easy to understand. For example, the operation and maintenance personnel can easily agree that the service monitoring indicator in FIG. 3 is abnormal. As shown in FIG. 3, where the horizontal axis represents time and the vertical axis represents the indicator value of the service monitoring indicator, during the time period 00:00:00~12:00:00, the service monitoring indicator, i.e., CPU_WAIT_IO, has a sudden increase in the indicator value, which in turn indicates a contention for the disk has occurred. On another aspect, many failures can be reflected in the sudden increase/decrease in some indicator value. On yet another aspect, it is relatively easy to calculate the observed probability corresponding to the sudden increase or decrease in the indicator value, which is suitable for scenarios that need to scan a large number of service monitoring indicators.

Calculating the observed probability of indicator value requires collecting some data first. Assuming that the failure begins at moment t, the data $\{x_i\}$ of the service monitoring indicator in the interval $[t-w_1,t]$ and the data $\{y\}$ of the service monitoring indicator in the interval $[t,t+w_2]$ are collected. Obviously $\{x_i\}$ is the data before the failure occurs. If $w_2$ is less than the failure duration, $\{y_j\}$ is the data when the failure occurs. In general, $w_1$ can take a relatively higher value so as to improve the accuracy of the observed probability. However, $w_2$ should be minimized so that the failure diagnosis result can be generated as soon as possible.

After $\{x_i\}$ and $\{y_j\}$ are obtained, the two sets of data can be compared to generate the observed probability. Spoken in mathematical language, $P(\{y_j\}|\{x_i\})$ needs to be calculated, that is, under the premise that $\{x_i\}$ is observed before moment t, the probability that $\{y_j\}$ is observed after moment t.

First, calculate the single point probability $P(y_j|\{x_i\})$. Assuming that $\{x_i\}$ is a sample generated from a random variable X, the distribution of X can be estimated from the $\{x_i\}$, and then the observed probability of $y_j$ is calculated from the distribution of X. Because the indicator values of most of service monitoring indicators are continuous, X should also be a continuous random variable, and the corresponding probability becomes:

$P(X \geq y_j|\{x_i\})$  overflow probability:

$P(X \leq y_j|\{x_i\})$  underflow probability:

When the probability that X is larger than $y_j$ is very small, it means that $y_j$ is too large, corresponding to a sudden increase. When the probability that X is less than $y_j$ is very small, it means that $y_j$ is too small, corresponding to a sudden decrease. Assuming that $y_j$ is a sample generated from random variables that are mutually independent and identically distributed as X, the collective probability is as follows:

$P_o(\{y_j\}|\{x_i\}) = \Pi_j P(X \geq y_j|\{x_i\})$  overflow probability:

$P_u(\{y_j\}|\{x_i\}) = \Pi_j P(X \leq y_j|\{x_i\})$  underflow probability:

For ease of calculation and viewing, the logarithm of the probability is usually calculated. However, since the logarithm of the probability is always negative, the negative of the logarithm of the probability is taken as an abnormal fraction, i.e., the degree of abnormal fluctuation. Thus:

$o = -\log P_o(\{y_j\}|\{x_i\}) = -\Sigma_j \log P(X \geq y_j|\{x_i\})$  overflow fraction:

$u = -\log P_u(\{y_j\}|\{x_i\}) = -\Sigma_j \log P(X \leq y_j|\{x_i\})$  underflow fraction:

Next, how to determine the distribution of X is explained. A common method is to assume that X follows a normal distribution and use $\{x_i\}$ to estimate two parameters of the normal distribution:

$$\hat{\mu} = \frac{\sum_i x_i}{n}$$

$$\hat{\sigma} = \sqrt{\frac{\sum_i (x_i - \hat{\mu})^2}{n-1}}$$

and finally, calculate the statistic of the z test based on $$z_j = \frac{y_j - \hat{\mu}}{\hat{\sigma}},$$

where $z_j$ obeys a normal distribution $\mathcal{N}(0, 1)$ using 0 being the mean and 1 being the standard deviation. The normal distribution can be used to calculate the overflow probability and the underflow probability of a single point:

$P(X \geq y_j|\{x_i\}) =$
$\quad P(z \geq z_j), z \cdot \mathcal{N}(0,1)$. the Overflow Probability of a Single Point:

$P(X \leq y_j|\{x_i\}) =$
$\quad P(z \leq z_j) z \sim \mathcal{N}(0,1)$. the underflow probability of a single point:

Exemplarily, the probability that $z_j$ is greater than 3 or less than −3 is about 0.13%, which is very small. Thus, when looking for the abnormal fluctuation, the threshold of the statistic $z_j$ is 3, i.e., a commonly used 3σ method.

It is considered that the indicator values of most service monitoring indicators do not follow normal distribution. For example, the indicator value of the CPU_IDLE service monitoring indicator varies between 0 and 1. Hence, when calculated according to the method described above, $\hat{\mu} - 3\hat{\sigma}$ is usually less than 0, and $\hat{\mu} + 3\hat{\sigma}$ is usually greater than 1, rendering it impossible to correctly reflect the degree of the abnormal fluctuation of the service monitoring indicator. Therefore, the embodiments of the present disclosure calculate a degree of first fluctuation and a degree of second fluctuation of the service monitoring indicator using kernel density estimation (KDE), where the degree of first fluctuation is a degree of fluctuation of the service monitoring indicator on the day that the failure occurs, and the degree of second fluctuation is a degree of fluctuation of the service monitoring indicator within a preset time period before the failure occurs.

Kernel density estimation is a non-parametric method for estimating the probability density function, which is applicable to the case where the distribution type obeyed by random variables is unknown. Based on $\{x_i\}$, the probability density function of X can be estimated as:

$$\hat{f}_h(x) = \frac{1}{n} \sum_i K_h(x - x_i)$$

where $K_h$ is a kernel function. When the kernel function is normally distributed, then the parameter h is approximately close to the standard deviation $\hat{\sigma}$ of $\{x_i\}$, and the probability density function becomes:

$$\hat{f}(x) = \frac{1}{n} \sum_i \mathcal{N}(x; x_i, \hat{\sigma})$$

For service monitoring indicators similar to CPU_IDLE, the Beta distribution can be used as the kernel function. At this time, the probability density function of X is estimated as:

$$\hat{f}(x) = \frac{1}{n} \sum_i \mathcal{B}(x; kx_i + 1, k(1 - x_i) + 1)$$

where k is a positive number that is used to control the shape of the Beta distribution. Larger k leads to spikier Beta distribution while smaller k leads to flatter Beta distribution.

After the probability density function of X is obtained, the probability of a single point (including the overflow probability and the underflow probability) can be calculated using integral as follows:

$P(X \geq y_j|\{x_i\}) =$
$\int_{y_j}^{+\infty} f(x) dx$     the overflow probability of the single point:

$P(X \leq y_j|\{x_i\}) =$
$\int_{-\infty}^{y_j} f(x) dx$     the underflow probability of the single point:

where the probability of the single point indicates the degree of abnormal fluctuation of the single point.

In summary, the S201: analyzing, according to an abnormality fluctuation detection algorithm, service monitoring indicator of a server where a service resides, and obtaining a degree of abnormal fluctuation of the service monitoring indicator can include: calculating a degree of first fluctuation and a degree of second fluctuation of the service monitoring indicator by using kernel density estimation (KDE); comparing, using an extreme value theory, the degree of first fluctuation and the degree of second fluctuation to determine a probability that the degree of first fluctuation is an abnormal fluctuation to obtain the degree of abnormal fluctuation of the service monitoring indicator. The degree of first fluctuation is a degree of fluctuation of the service monitoring indicator on the day that the failure occurs, and the degree of second fluctuation is a degree of fluctuation of the service monitoring indicator within a preset time period before the failure occurs.

II. Clustering

Optionally, the S202: clustering servers with similar degree of abnormal fluctuation according to the degree of abnormal fluctuation in the service monitoring indicator can include: clustering servers with similar degree of abnormal fluctuation using a preset clustering algorithm according to the degree of abnormal fluctuation of the service monitoring indicator, where the preset clustering algorithm is a hierarchical clustering algorithm or a DBSCAN algorithm.

For the preset clustering algorithm, the hierarchical clustering algorithm and the DBSCAN algorithm can better adapt to various requirements because the types of abnormal fluctuations cannot be obtained in advance.

Further, before the clustering the servers with similar degree of abnormal fluctuation using the preset clustering algorithm, the method can further include: for each server, sorting the degree of abnormal fluctuation of the service monitoring indicator corresponding to the each of the servers to obtain a sorted result corresponding to the each server; and calculating a correlation coefficient between the sorted results corresponding to two servers.

Specifically, after calculating the degree of abnormal fluctuation for each service monitoring indicator, the degrees of abnormal fluctuation of the service monitoring indicators belonging to the same server are combined to form a vector $\langle o_1, o_2, \ldots, u_1, u_2, \ldots \rangle$ of degree of abnormal fluctuation, where each subscript corresponds to one service monitoring indicator.

In order to facilitate viewing, servers with similar degrees of abnormal fluctuation need to be clustered together by clustering, which is one of the typical methods of unsupervised learning. Unlike supervised learning, clustering cannot control the output by the label of the sample. Thus, the core controlling the clustering direction falls on the distance function and the clustering algorithm.

There are many choices of distance functions. Usually, a Euclidean distance, or more generally, a $L_p$ distance, a cosine distance that calculates the angle between the vectors can be selected. Even a correlation coefficient can be used to measure the distance between two vectors. When the loads on different servers belonging to the same module are almost identical, the Euclidean distance should provide good results. However, in practice, the loads on servers almost always differ, which makes the same abnormal fluctuations show different abnormal fluctuations on different servers, and the Euclidean distance will affect the performance of the clustering. Instead, the correlation coefficient can calculate the correlation between the abnormal fluctuations of two servers while ignoring the absolute level of the value. Firstly, the service monitoring indicators of one server are sorted according to their degrees of abnormal fluctuation, and then the correlation coefficient between the abnormal degree rankings of the two servers is calculated.

Correspondingly, the clustering the servers with similar degree of abnormal fluctuation using the preset clustering algorithm can include: clustering the servers with similar degree of abnormal fluctuation using the preset clustering algorithm based on the correlation coefficient.

In addition, when clustering, it is theoretically possible to cluster all the servers of all modules together. But in an experiment, the inventor found that, while the clustering result derived when all the servers of all modules are clustered together can reveal cross-module problems, e.g., a breakdown of an entire network service system by failurey communications between multiple modules which are in turn caused by a failure in the network, such clustering result can be less efficient in some cases. Therefore, the embodiments of the present disclosure limit the clustering to a single module or computer room to better perform failure diagnosis. Each computer room includes a plurality of servers, and a service includes at least one module.

Large network service systems typically deploy mirroring systems in a plurality of computer rooms to ensure performance and availability. Since most of the failures only occur in the system of one computer room, the operation and maintenance personnel needs not only know the root cause module that had caused the failure, but also the computer room where the module is located.

Based on the above, the clustering the servers with similar degree of abnormal fluctuation using the preset clustering algorithm can include: clustering the servers included in each computer room according to the module included in the service.

In a specific implementation manner of the above embodiment, the S203: determining, according to the clustered results, the location where the service fails can include: sorting the clustered results according to a preset sorting strategy; and determining, according to the sorted results, a location where the service fails.

The preset sorting strategy is derived by training using annotated data. The annotated data refers to the data obtained when a historical failure (or a prior failure) occurs.

The above embodiments cluster servers with similar abnormal fluctuation patterns to form a summary. Each summary already possesses some readability, and thus only the summary associated with the root cause module is required to be suggested to the operation and maintenance personnel.

The factors to be considered in setting up the preset sorting strategy include:

1. The number of servers in the summary, in that more servers indicate greater impact, thus more likely to be the root cause module causing the failure.

2. The number of service monitoring indicators with particularly high degree of abnormal fluctuation in the summary, and more service monitoring indicators are more likely to lead to the root cause module causing the failure.

3. The average abnormal fluctuation degree of the service monitoring indicators of each server in the summary, and higher average abnormal fluctuation degree is more likely to lead to the root cause module causing the failure.

By calculating the values of the above three factors, three feature values are formed, and then the sorted results are obtained according to the three feature values.

Exemplarily, Table 1 is an automatic analysis result of the failure case shown in FIG. 1. The first column in Table 1 is the module and the computer room to which the summary belongs, the second column is the proportion of the servers sharing the same module and the same computer room in the summary, the third column is a list of all servers in the summary, and the fourth column is the service monitoring indicator with particularly high abnormal fluctuations and the corresponding degree of abnormal fluctuations thereof.

The embodiment of the disclosure suggests a summary in module G as the first result. Through the contents of the fourth column, it can be seen that the module G in the computer room DC1 is overloaded for some reason. After the module G is overloaded, the response of the module G to the upstream module is slowed down, so that the module E in the same computer room maintains more RPC connections. Therefore, the module E in the same computer room is ranked second, and the service monitoring indicator involved in the number of network connections is also abnormal.

TABLE 1

| Module and Computer room | Proportion | List of Servers | Service Monitoring Indicator and Corresponding Degree of Abnormal Fluctuations Thereof | |
|---|---|---|---|---|
| G.DC1 | 0.3 | 1.G.DC1 | CPU_SERVER_LOADAVG_1 | 22.801403 |
| | | 2.G.DC1 | NET_TCP_ACTIVE_OPENS | 16.90959 |
| | | 3.G.DC1 | CPU_IDLE | 15.137489 |
| | | . . . | CPU_HT_IDLE | 14.600515 |
| | | | NET_TCP_TIME_WAIT | 11.838425 |
| | | | CPU_INTERRUPT | 11.682794 |
| | | | NET_TCP_OUT_SEGS | 11.613833 |
| | | | CPU_SERVER_LOADAVG_5 | 11.550683 |
| | | | NET_TCP_IN_SEGS | 11.136453 |
| | | | . . . | |
| E.DC1 | 0.1 | 7.E.DC1 | NET_TCP_CURR_ESTAB | 15.696724 |
| | | 9.E.DC1 | NET_TOTAL_SOCKETS_USED | 14.688062 |
| | | . . . | DISK_TOTAL_READ_REQ | 11.241439 |
| | | | . . . | |

Figure 4:
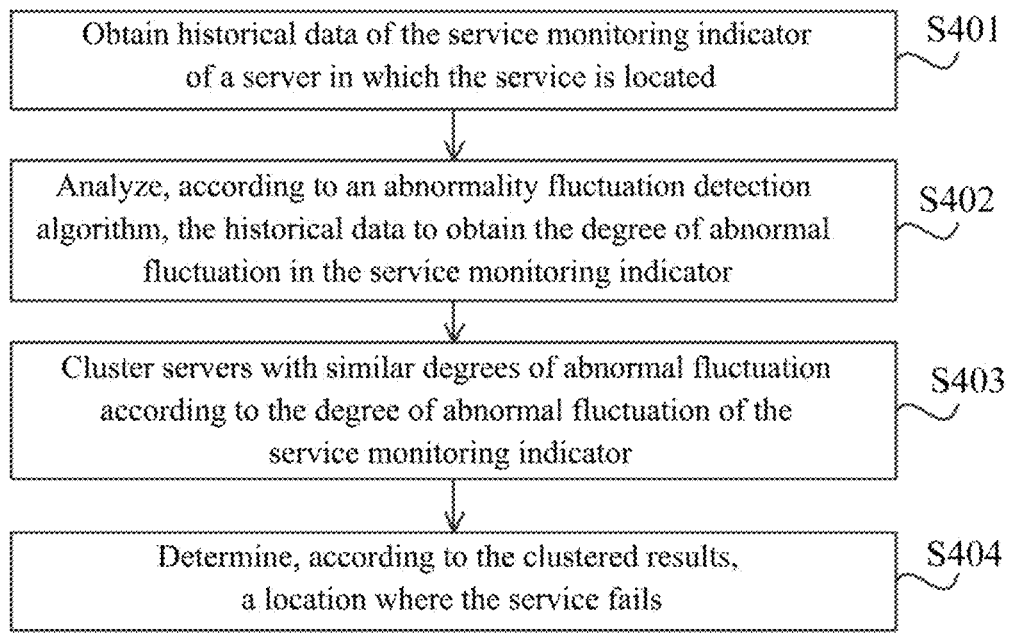
FIG. 4 is a flowchart of a method for diagnosing failure based on a service monitoring indicator according to another embodiment of the present disclosure.

FIG. 4 is a flowchart of a method for diagnosing failure based on a service monitoring indicator according to another embodiment of the present disclosure. Referring to FIG. 4, based on the process shown in FIG. 1, the method for diagnosing failure based on the service monitoring indicator can include:

S401, obtaining historical data of the service monitoring indicator of a server in which the service is located;

For example, the historical data may be the data $\{x_i\}$ of the above-mentioned service monitoring indicator in the interval $[t-w_1,t]$, and data $\{y_j\}$ of the above-mentioned service monitoring indicator in the interval $[t,t+w_2]$.

S402, analyzing, by the abnormality fluctuation detection algorithm, the historical data to obtain the degree of abnormal fluctuation of the service monitoring indicator.

S403, clustering servers with similar degrees of abnormal fluctuation according to the degree of abnormal fluctuation of the service monitoring indicator.

S404, determining, according to the clustered results, a location where the service fails.

S402-S404 are similar to the S201 to S203 in the embodiment shown in FIG. 2. The specific implementation scheme refers to the embodiment shown in FIG. 2, and the details are not described herein again.

The following is an embodiment of an apparatus of the present disclosure, which can be used to implement the foregoing method embodiments of the present disclosure, and the implementation principle and technical effects are similar.

Figure 5:
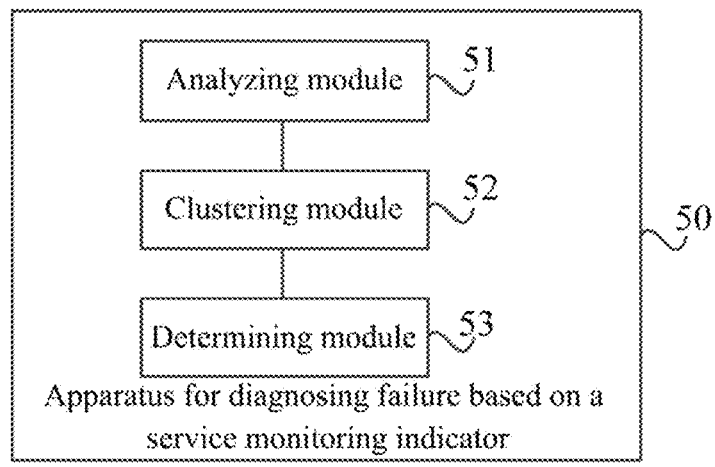
FIG. 5 is a schematic diagram of a structure of an apparatus for diagnosing failure based on a service monitoring indicator according to one embodiment of the present disclosure.

FIG. 5 is a schematic structural diagram of an apparatus for diagnosing failure based on a service monitoring indicator according to an embodiment of the present disclosure. The embodiment of the present disclosure provides an apparatus for diagnosing failure based on a service monitoring indicator, the apparatus for diagnosing failure based on the service monitoring indicator can be implemented by software and/or hardware. As shown in FIG. 5, the apparatus 50 for diagnosing failure based on the service monitoring indicator includes an analyzing module 51, a clustering module 52, and a determining module 53.

The analyzing module 51 is configured to analyze, according to an abnormality fluctuation detection algorithm, a service monitoring indicator of a server, in which a service is located, to obtain a degree of abnormal fluctuation of the service monitoring indicator.

The clustering module 52 is configured to cluster servers with similar degree of abnormal fluctuation according to the degree of abnormal fluctuation in the service monitoring indicator, where the clustered results include the server and the service monitoring indicator.

The determining module 53 is configured to determine, according to the clustered results, a location where the service fails.

The apparatus for diagnosing failure based on the service monitoring indicator provided in the present embodiment may be used to perform the foregoing method embodiments, and the implementations and the technical effects thereof are similar, and will not be repeated in the present embodiment again.

Optionally, the analyzing module 51 can be specifically configured to: calculate a degree of first fluctuation and a degree of second fluctuation of the service monitoring indicator using kernel density estimation; compare, using an extreme value theory, the degree of first fluctuation and the degree of second fluctuation to determine a probability that the degree of first fluctuation is an abnormal fluctuation to obtain the degree of abnormal fluctuation of the service monitoring indicator, where the degree of first fluctuation is a degree of fluctuation of the service monitoring indicator on the day that the failure occurs, and the degree of second fluctuation is a degree of fluctuation of the service monitoring indicator within a preset time period before the failure occurs.

In some embodiments, the clustering module 52 can be specifically configured to: cluster, according to a preset clustering algorithm, servers with similar degrees of abnormal fluctuation based on the degree of abnormal fluctuation of the service monitoring indicator, where the preset clustering algorithm is a hierarchical clustering algorithm or a DBSCAN algorithm.

Further, the clustering module 52 can also be configured to: before the clustering the servers with similar degrees of abnormal fluctuation using the preset clustering algorithm, for each server, sort the degree of abnormal fluctuation of the service monitoring indicator corresponding to the each of the servers to obtain a sorted result corresponding to the each server; and calculate a correlation coefficient between the sorted results corresponding to two servers.

Correspondingly, when clustering the servers with similar degrees of abnormal fluctuation using the preset clustering algorithm, the clustering module 52 is specifically configured to: cluster the servers with similar degrees of abnormal fluctuation using the preset clustering algorithm based on the correlation coefficient.

In some embodiments, each computer room includes a plurality of the servers, and the service includes at least one module. Therefore, optionally, when clustering the servers with similar degrees of abnormal fluctuation using the preset clustering algorithm, the clustering module 52 is specifically configured to: cluster the servers included in each computer room according to the module included in the service.

Optionally, the determining module 53 can be specifically configured to: sort the clustered results according to a preset sorting strategy; and determine, according to the sorted results, a location where the service fails.

Further, the apparatus 50 for diagnosing failure based on a service monitoring indicator can also include: an obtaining module (not shown). The obtaining module is configured to, before the analyzing module 51 analyzes, according to an abnormality fluctuation detection algorithm, a service monitoring indicator of a server, in which a service is located, to obtain a degree of abnormal fluctuation of the service monitoring indicator: obtain historical data of the service monitoring indicator of a server where the service is located. At this time, the analyzing module 51 can be specifically configured to: analyze, by the abnormality fluctuation detection algorithm, the historical data to obtain the degree of abnormal fluctuation of the service monitoring indicator.

Figure 6:
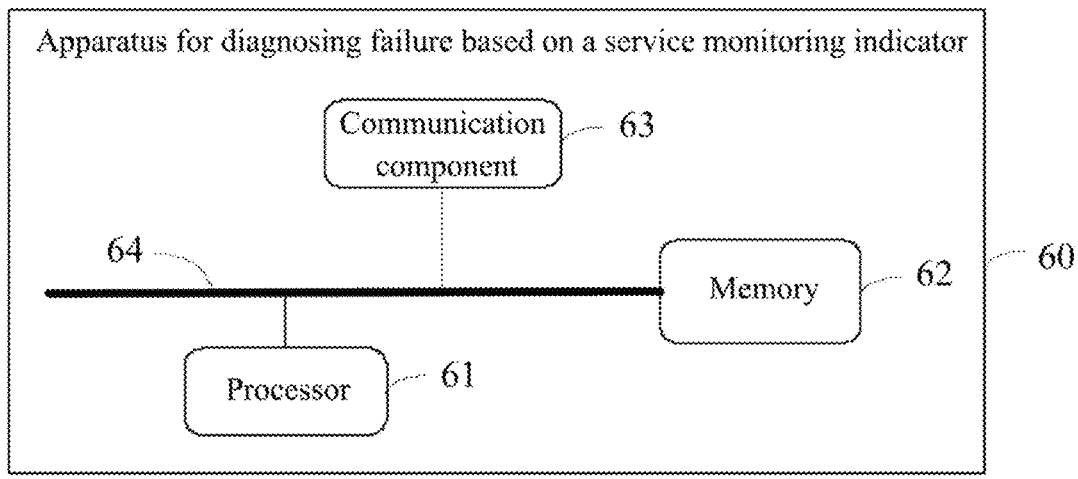
FIG. 6 is a schematic diagram of a structure of an apparatus for diagnosing failure based on a service monitoring indicator according to another embodiment of the present disclosure.

FIG. 6 is another schematic structural diagram of an apparatus for diagnosing failure based on a service monitoring indicator according to an embodiment of the present disclosure. As shown in FIG. 6, the apparatus 60 for diagnosing failure based on a service monitoring indicator includes: a processor 61 and a memory 62, where:

the memory 62 stores computer executable instructions;

the processor 61 executes the computer executable instructions stored in the memory 62, such that the processor 61 performs the method for the diagnosing failure based on the service monitoring indicator as mentioned above.

The specific implementation process of the processor 61 can refer to the above method embodiment, and the implementations and the technical effects thereof are similar, which will not be repeated in the present embodiment again.

Optionally, the apparatus 60 for diagnosing failure based on the service monitoring indicator further includes a communication component 63. The processor 61, the memory 62, and the communication component 63 can be connected via a bus 64.

An embodiment of the present disclosure further provides a computer readable storage medium storing therein computer executable instructions that, when executed by a processor, implement the method for the diagnosing failure based on the service monitoring indicator as mentioned above.

In the above embodiments, it should be understood that the disclosed devices and methods may be implemented in other manners. For example, the device embodiments described above are merely illustrative. For example, the division of the modules is only a logical function division, and the actual implementation may have other division manners. For example, multiple modules may be combined or integrated into another system. Some features may be omitted or skipped. In addition, the mutual coupling or direct coupling or communicative connection shown or discussed may be an indirectly coupling or communicative connection made via some kind of interface, device or module, and may be electrical, mechanical or otherwise.

The modules described as separate components may or may not be physically separated, and the components displayed as a module may or may not be physically a unit, i.e., they may be located in one place, or may be distributed throughout multiple network units. Some or all of the modules may be selected according to actual needs to achieve the purpose of the solution of the embodiments.

In addition, functional modules in individual embodiments of the present disclosure may be integrated into one processing unit, or may exist physically as separate modules, or two or more modules may be integrated into one unit. The unit formed by the above modules can be implemented in the form of hardware or hardware plus software functional units.

The above-mentioned integrated modules implemented in the form of software function module can be stored in a computer readable storage medium. The above software function module is stored in a storage medium, which includes a number of instructions to cause a computer device (which may be a personal computer, server, or network device, etc.) or a processor to perform some of the steps of the methods described in various embodiments of the present application.

It should be understood that the processor as mentioned above may be a central processing unit (CPU) and may also be other general purpose processors, digital signal processors (DSP), and application specific integrated circuits (ASIC). The general purpose processor may be a microprocessor or the processor or any conventional processor or the like. The steps of the method disclosed with reference to the disclosure may be directly embodied by the execution of the hardware processor or by a combination of hardware and software modules in the processor.

The memory may include high speed RAM memory, and may also include non-volatile memory NVM, such as at least one disk memory, and may also be a USB flash drive, a removable hard disk, a read only memory, a magnetic disk, or an optical disk.

The bus may be an Industry Standard Architecture (ISA) bus, a Peripheral Component (PCI) bus, or an Extended Industry Standard Architecture (EISA) bus. The bus can be divided into an address bus, a data bus, a control bus, and the like. For ease of representation, the bus in the drawings of the present application is not limited to only one bus or one type of bus.

The above storage medium may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk. A storage medium may be any available media that can be accessed by a general purpose or special purpose computer.

An exemplary storage medium is coupled to the processor to enable the processor to read information from, and write information to, the storage medium. Of course, the storage medium can also be an integral part of the processor. The processor and the storage medium may be located in an Application Specific Integrated Circuits (ASIC). Of course, the processor and the storage medium may also reside as a discrete component in a terminal or server.

It will be understood by those skilled in the art that all or part of the steps of implementing the above method embodiments may be performed by hardware related to the program instructions. The aforementioned program can be stored in a computer readable storage medium. The program, when executed, performs the steps including the foregoing method embodiments; and the foregoing storage medium includes various media that can store program codes, such as a ROM, a RAM, a magnetic disk, or an optical disk.

Finally, it should be noted that the above embodiments are only used to illustrate the technical solution of the present disclosure, and are not limited thereto; although the present disclosure has been described in detail with reference to the foregoing embodiments, it will be understood by those skilled in the art that the technical solutions described in the foregoing embodiments may be modified or equivalent replaced for some or all of the technical features; the modifications and replacements do not depart from the scope of the technical solutions of the embodiments of the present disclosure.

What is claimed is:

1. A method for diagnosing failure based on a service monitoring indicator, wherein the method comprises:
    analyzing, according to an abnormality fluctuation detection algorithm, a service monitoring indicator of a server, in which a service is located, to obtain a degree of abnormal fluctuation in the service monitoring indicator;
    clustering servers with similar degrees of abnormal fluctuation according to the degree of abnormal fluctuation of the service monitoring indicator, wherein clustered results comprise the servers and the service monitoring indicator; and
    determining, according to the clustered results, a location where the service fails;
    wherein the analyzing, according to an abnormality fluctuation detection algorithm, a service monitoring indicator of a server, in which a service is located, to obtain a degree of abnormal fluctuation in the service monitoring indicator, comprises:
    calculating a degree of first fluctuation and a degree of second fluctuation of the service monitoring indicator using kernel density estimation (KDE), wherein the degree of first fluctuation is a degree of fluctuation in the service monitoring indicator on the same day that the failure occurs, and the degree of second fluctuation is a degree of fluctuation in the service monitoring indicator within a preset time period before the failure occurs; and comparing, according to an extreme value theory, the degree of first fluctuation and the degree of second fluctuation to determine a probability that the degree of first fluctuation is an abnormal fluctuation, so as to obtain the degree of abnormal fluctuation of the service monitoring indicator.

2. The method according to claim 1, wherein the clustering servers with similar degrees of abnormal fluctuation according to the degree of abnormal fluctuation of the service monitoring indicator comprises:

clustering, according to the degree of abnormal fluctuation in the service monitoring indicator, servers with similar degrees of abnormal fluctuation using a preset clustering algorithm, wherein the preset clustering algorithm is a hierarchical clustering algorithm or a Density-Based Spatial Clustering of Applications with Noise (DBSCAN) algorithm.

3. The method according to claim 2, wherein, before the clustering servers with similar degrees of abnormal fluctuation using the preset clustering algorithm, the method further comprises:

for each server, sorting the degree of abnormal fluctuation in the service monitoring indicator corresponding to the each server to obtain a sorted result corresponding to the each server;

calculating a correlation coefficient between sorted results corresponding to two servers; and correspondingly, the clustering servers with similar degrees of abnormal fluctuation using the preset clustering algorithm comprises: clustering servers with similar degrees of abnormal fluctuation using the preset clustering algorithm based on the correlation coefficient.

4. The method according to claim 2, wherein each computer room comprises a plurality of the servers, the service comprises at least one module, and the clustering servers with similar degrees of abnormal fluctuation using the preset clustering algorithm comprises:

clustering the servers comprised in the each computer room according to the module comprised in the service.

5. The method according to claim 1, wherein the determining, according to the clustered results, the location where the service fails comprises:

sorting the clustered results according to a preset sorting strategy; and determining, according to the sorted results, a location where the service fails.

6. The method according to claim 1, wherein, before the analyzing, according to an abnormality fluctuation detection algorithm, a service monitoring indicator of a server, in which a service is located, to obtain a degree of abnormal fluctuation in the service monitoring indicator, the method further comprises:

obtaining historical data of the service monitoring indicator of a server in which the service is located; and correspondingly, the analyzing, according to an abnormality fluctuation detection algorithm, a service monitoring indicator of a server, in which a service is located, to obtain a degree of abnormal fluctuation in the service monitoring indicator comprises: analyzing, according to an abnormality fluctuation detection algorithm, the historical data to obtain the degree of abnormal fluctuation in the service monitoring indicator.

7. An apparatus for diagnosing failure based on a service monitoring indicator, the apparatus comprising a processor and a computer-readable medium for storing program codes, which, when executed by the processor, cause the processor to:

analyze, according to an abnormality fluctuation detection algorithm, a service monitoring indicator of a server, in which a service is located, to obtain a degree of abnormal fluctuation in the service monitoring indicator;

cluster servers with similar degrees of abnormal fluctuation according to the degree of abnormal fluctuation of the service monitoring indicator, wherein clustered results comprise the servers and the service monitoring indicator; and determine, according to the clustered results, a location where the service fails;

wherein the program codes further cause the processor to calculate a degree of first fluctuation and a degree of second fluctuation of the service monitoring indicator using kernel density estimation (KDE), wherein the degree of first fluctuation is a degree of fluctuation in the service monitoring indicator on the same day that the failure occurs, and the degree of second fluctuation is a degree of fluctuation in the service monitoring indicator within a preset time period before the failure occurs; and compare, according to an extreme value theory, the degree of first fluctuation and the degree of second fluctuation to determine a probability that the degree of first fluctuation is an abnormal fluctuation, so as to obtain the degree of abnormal fluctuation of the service monitoring indicator.

8. The apparatus according to claim 7, wherein the program codes further cause the processor to:

cluster, according to the degree of abnormal fluctuation in the service monitoring indicator, servers with similar degrees of abnormal fluctuation using a preset clustering algorithm, wherein the preset clustering algorithm is a hierarchical clustering algorithm or a Density-Based Spatial Clustering of Applications with Noise (DBSCAN) algorithm.

9. The apparatus according to claim 8, wherein the program codes further cause the processor to:

before the clustering servers with similar degrees of abnormal fluctuation using the preset clustering algorithm, for each server, sort the degree of abnormal fluctuation in the service monitoring indicator corresponding to the each server to obtain a sorted result corresponding to the each server;

calculate a correlation coefficient between sorted results corresponding to two servers; and correspondingly, when clustering servers with similar degrees of abnormal fluctuation using the preset clustering algorithm, the program codes further cause the processor to: cluster servers with similar degrees of abnormal fluctuation using the preset clustering algorithm based on the correlation coefficient.

10. The apparatus according to claim 8, wherein each computer room comprises a plurality of the servers, the service comprises at least one module;

when clustering servers with similar degrees of abnormal fluctuation using the preset clustering algorithm, the program codes further cause the processor to:

cluster the servers comprised in the each computer room according to the module comprised in the service.

11. The apparatus according to claim 7, wherein the program codes further cause the processor to:
- sort the clustered results according to a preset sorting strategy; and
- determine, according to the sorted results, a location where the service fails.

12. The apparatus according to claim 7, wherein the program codes further cause the processor to:
- obtain historical data of the service monitoring indicator of a server in which the service is located before analyzing, according to an abnormality fluctuation detection algorithm, a service monitoring indicator of a server, in which a service is located, to obtain a degree of abnormal fluctuation in the service monitoring indicator; and
- correspondingly, the program codes further cause the processor to: analyze, according to an abnormality fluctuation detection algorithm, the historical data to obtain the degree of abnormal fluctuation in the service monitoring indicator.

13. A computer readable storage medium storing therein computer executable instructions that, when executed by a processor, implement the method for diagnosing failure based on a service monitoring indicator according to claim 1.

\* \* \* \* \*